(No Model.)
S. M. LILLIE.
PROCESS OF AND APPARATUS FOR EVAPORATING SUGAR SOLUTIONS.
No. 341,669. Patented May 11, 1886.
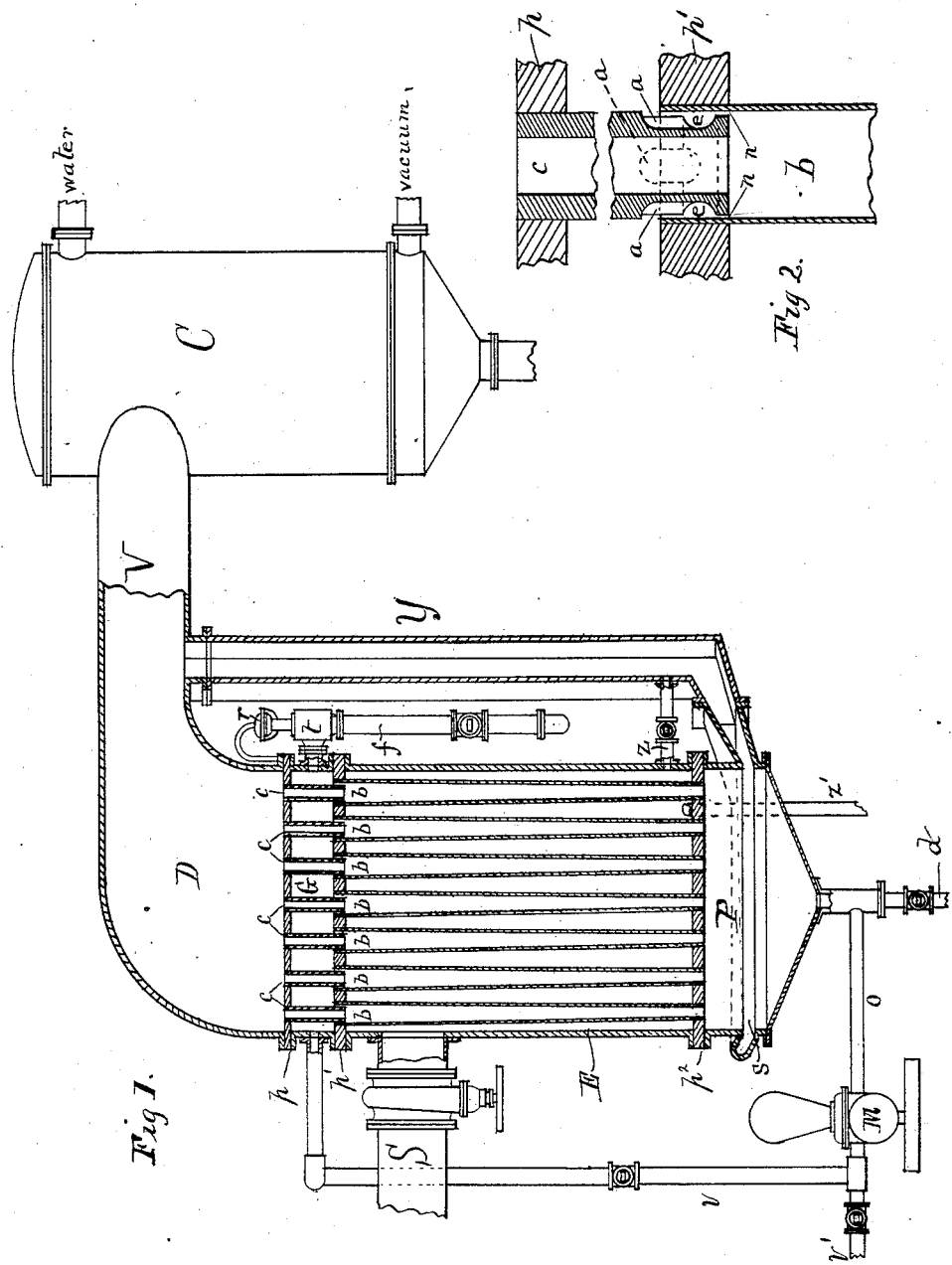
WITNESSES:
Paul E. Seeber
Jacob C. Munch.
INVENTOR
S. Morris Lillie

UNITED STATES PATENT OFFICE.

S. MORRIS LILLIE, OF PHILADELPHIA, PENNSYLVANIA.

PROCESS OF AND APPARATUS FOR EVAPORATING SUGAR SOLUTIONS.

SPECIFICATION forming part of Letters Patent No. 341,669, dated May 11, 1886.

Application filed April 25, 1884. Serial No. 129,291. (No model.)

*To all whom it may concern:*

Be it known that I, S. MORRIS LILLIE, a citizen of the United States, residing at Philadelphia, in the county of Philadelphia and State of Pennsylvania, have invented a new and useful Process of Evaporating Sugar Solutions and other Liquids and Apparatus for Carrying on the Same, of which the following is a specification.

The process consists in causing the sugar solution to be evaporated to flow in thin films over surfaces heated by steam or otherwise, and in maintaining in the space or spaces in which these surfaces are exposed and in which the evaporation takes place a more or less perfect vacuum to facilitate the evaporation of the solution flowing over the heated surfaces.

The apparatus for practicing the process may be constructed and arranged in a variety of ways; but I prefer and consider most advantageous a disposition in which the evaporating-surfaces are vertical or but slightly inclined to the vertical, for the reasons, among others, that the sugar solutions may be made to flow in thinner films over surfaces so arranged than would be the case if the surfaces were more nearly horizontal, and that for a given space occupied by the apparatus a much greater extent of surface may be made efficient for the evaporation. For example, suppose a tube having a rectangular cross-section with its walls heated from the outside to be used in practicing my process. If the tube is vertical the solution may be made to flow in thin films down all four sides of the tube, while if the tube is inclined only the lower side of the tube can be utilized.

In the drawings I have shown apparatus well adapted for carrying on the process, Figure 1 being a vertical section of an evaporator, shown in connection with a suitable vacuum-inducing apparatus; and Fig. 2, a modified detail of Fig. 1.

In Fig. 1, E is a steam-chamber containing a battery of vertical tubes, $b$ $b$, &c., which pass tightly through the tube-plates $p'$ and $p^2$, which form the top and bottom walls, respectively, of the chamber E, and open above into the chamber G, and below into a chamber or well, P.

Above the chamber G, and divided from it by the tube-plate $p$, is a dome, D, which communicates with the interiors of the tubes $b$ through the tubes $c$, which are fixed in the tube-plate $p$, and extend downward through the chamber G into the interiors of the tubes $b$. The outside diameters of the tubes $c$ are slightly smaller than the inside diameters of the tubes $b$, as a result of which there is formed between the walls of each pair of tubes $b$ $c$ an annular passage putting the chamber G in communication with the interior of the tube $b$ in such fashion that any liquid introduced into the chamber G will be delivered by this annular channel upon and be more or less evenly distributed over the interior surface of the tube, down which it will flow into the well P.

In Fig. 2 is shown a modified form of the passages between the chamber G and the interiors of the tubes $b$. The figure is a limited vertical and axial section through one pair of tubes $b$ $c$. The walls of the tube $c$ are quite thick and of such outside diameter as to just pass into the upper end of the tube $b$.

On the portion of the tube $c$ which projects into the tube $b$ is cut a horizontal groove, $e$, which communicates with the chamber G above through a series of channels, $a$, formed in the walls of the tube $c$, and with the interior of the tube $b$ below through the annular passage $n$, which may be formed by turning the tube $c$, between its lower extremity and the channel $e$, to a slightly smaller diameter than that of the rest of the tube. Above the channel $e$ the wall of the tube $c$ fits snugly in the tube $b$, maintaining thereby a concentricity of the tubes and a uniform thickness of the annular channel $n$. A liquid introduced into the chamber G will flow through the channels $a$ into the groove $e$, and thence through the annular passage $n$ onto the interior surface of the tube $b$. The chamber G is in communication with a supply of the sugar solution to be evaporated through a pipe, $f$, which is provided at some point conveniently near the chamber with a balanced valve, $t$, operated by an adjustable regulator, $r$, which is governed in its working by the pressure in the chamber G, and which may be set so as to maintain any desired pressure of liquid in the chamber which does not exceed that in the main $f$.

Such valves and regulators are in common use, and so do not require any description here. The dome D communicates through the conduit V with a condenser, C, having the usual vacuum-pumps and other necessary fittings, with which also the well P communicates through the conduits Y V, the former of which opens into the well through the narrow passage s, encircling the same. The well P is connected by means of the pipe O with the pump M, whose discharge-pipe delivers either through the branch v into the chamber G or through the branch v' to some other destination. The pipe d delivers into or at the bottom of a suitable tank located some thirty-four feet below the well. The well may have the usual appendages of a vacuum-pan—viz., proof-stick and port, thermometer, gage-glass, hydrometer-well, &c.—and, if so desired in special instances, may be made sufficiently deep and large and be fitted with the steam-coils of the ordinary vacuum-pan, the *ensemble* becoming, indeed, a vacuum-pan with my evaporator superimposed upon it.

The chamber E, containing the battery of tubes b, has the main S opening into it, which has connections (not shown) such that either live or exhaust steam may be led into the chamber. These connections (mains) may have pressure-regulating valves similar to the valve t, governed by the pressure in the chamber E, by which the pressure in the latter may be maintained at or below any degree desired. The evaporating-tubes b, which extend through this chamber, are shown as having smaller diameters at their lower ends than at their upper extremities. The walls of each tube therefore present a slight incline to the vertical for the solutions to run down. This construction promotes a somewhat firmer contact between the solutions and the surfaces of the tubes, and at the same time a freer escape for the vapors from the solutions than would be the case were the walls of the tubes strictly vertical. The chamber E has a connection through the pipe z with the vacuum inducing apparatus, by which air collected in the chamber may be removed from it at any time.

The method of using the above-described apparatus for the evaporation of a sugar solution and the advantages attendant upon its use are as follows: The condenser C and pumps for maintaining a vacuum in the dome D, well P, and tubes b are started, the air in the chamber E exhausted through the pipe z, and the communication between the chamber and the steam-supply through the main S opened. The sugar-liquor which is to be evaporated is then allowed to flow freely through the main f into the chamber G, excepting as controlled by the valve t, which is set so that the pressure proper to cause the desired rate of flow of the liquor from the chamber G into the interiors of the tubes b may be maintained in the former, from which it flows through the channels between the tubes b and c, onto the interior surfaces of the heated tubes b, down which it flows into the well P, reaching the latter more or less concentrated by its passage down the tubes, by the evaporation caused by the heat of the tubes and the vacuum maintained in the interior of the same. The vapors resulting from the evaporation within the tubes escape from the latter from both ends—from the lower ends into the well P and from the upper ends through the tubes c into the dome D—all finding their way through the conduits Y and V to the condenser C, in which they are condensed and by which the vacuum-pumps a more or less perfect vacuum is maintained in the tubes b. If the sugar solution is not sufficiently thickened by once passing through the tubes, it is drawn from the well P by the pump M and delivered again into the chamber G, whence it flows a second time through the tubes, either by itself or mixed with fresh solution flowing into G from the main f. This returning of the liquor to the chamber G may be repeated as many times as may be necessary to concentrate it to the desired degree. While the solution is being returned thus from the well P, the flow of the fresh liquor through the main f into the chamber G is partially checked by the closing to a greater or less degree of the valve t, by the increased pressure in the chamber G, due to the influx of the partially-concentrated liquor from the well P. The concentrated solution may be delivered by the pump through the pipe v' to any desired destination, or it may be allowed to flow by its own weight down the tube d into the tank below, before mentioned, underneath the surface of some liquor, into which the end of the tube should extend, in order that no air may pass up through the same and destroy the vacuum in the apparatus. The water of condensation in the chamber E escapes from the bottom of the same through the pipe z', which is provided with a suitable steam-trap. (Not shown.)

I omitted to state in the description of the apparatus that the chamber G should have proper steam and water connections, so that when necessary the tubes, chamber, and well may be thoroughly steamed and cleansed.

Among the advantages attendant upon the use of this process and apparatus are, the greater rapidity and lower temperature at which the evaporation is carried on and the lower pressure of the steam by which the evaporation is effected, all of which are due to the extreme freeness with which the vapors formed can escape from the evaporating liquid and to the absence of all pressure of a superincumbent mass of liquid upon the layers in contact with the evaporating-surfaces.

In the vacuum-pans ordinarily used, the evaporating-surfaces have various depths of liquor upon them, depending upon the size of the pan and upon their location in the same, but ranging up to six, eight, or ten feet, and in some instances even more, producing, in consequence, a very considerable pressure on the coils or tubes, furnishing the lower evaporating-surfaces, against which the evaporation can only take place at a temperature considerably above the boiling-point of the liquid, corresponding to the degree of vacuum or of pressure maintained in the pan above the surface of the liquid.

With regard to the delivering the liquid to be evaporated upon the surfaces of the evaporating-tubes, various means may be employed differing from those hereinbefore specified. For example, the liquid may be delivered into the surfaces of the tubes through pipes arranged above the mouths of the tubes, and having jets projecting downward, one into the mouth of each, from which the liquid sprays upon the surface of the tube. The arrangement of the evaporating-surfaces, too, may be varied indefinitely. The cross-sections of the tubes may be rectangular, square, or oblong—in the latter case forming broad narrow chambers, down the flat sides of which the liquor to be evaporated flows. Again, the surfaces used for evaporation may be the outer surfaces of the tubes $b$, as shown in a pending application, the steam or other source of heat in that case being applied to the interiors of the tubes, and the case containing the tubes, as E in the accompanying drawings, being connected with the condenser and vacuum-pumps. The source of heat for the evaporation may also be various—as steam, hot liquids, or hot non-condensable gases. In case non-condensable agents are to be used—as liquids or permanent gases—the chamber E must be constructed so as to permit a more rapid flow of the agents through the same.

Although the apparatus shown is more especially designed for the evaporation of sugar solutions, it is of course applicable to the evaporation of other liquids as well.

Thus having described my invention, I claim as mine and desire to secure to myself by Letters Patent of the United States—

1. In an apparatus for evaporating liquids, a series of vertical or approximately vertical surfaces heated by steam or otherwise, means for delivering the liquid to be evaporated upon each surface at or near the top, and means for maintaining a vacuum (more or less perfect) in the spaces in which the surfaces are exposed, substantially as specified.

2. The within-described apparatus for evaporating liquids, consisting of a battery of vertical tubes surrounded by a heating-chamber, means for delivering the liquid to be evaporated upon the interior surfaces of each tube near its upper end, avenues for the escape of the vapors of evaporation from the interior of the tubes, and means for maintaining a more or less perfect vacuum in the interiors of the tubes, substantially as specified.

3. In an apparatus for the evaporation of liquids, the combination of a battery of vertical tubes extending through a heating-chamber, E, a chamber, G, above the heating-chamber, for receiving the liquid that is to be evaporated, channels leading from the chamber G into the interior of the tubes and adapted to deliver the liquid over the inner surfaces of the same, and means for maintaining a more or less perfect vacuum in the tubes, substantially as specified.

4. In an apparatus for evaporating liquids, the combination of the heating-chamber containing the battery of tubes $b$, chamber G, communicating with the interiors of the tubes, as described, chamber P, and conduit Y, connecting the chamber or well P with a suitable vacuum-inducing apparatus, substantially as described.

5. In an apparatus for evaporating liquids, the combination of a battery of tubes contained in a heating-chamber, means for delivering a liquid upon the interior surfaces of the tubes near their upper ends, well P, for receiving the vapors and unevaporated liquid from the lower ends of the tubes, and means for maintaining a more or less perfect vacuum in the well P, substantially as specified.

6. In an evaporating apparatus constructed and operating as set forth, the combination of a battery of tubes, $b$, contained in a suitable heating-chamber, well P, with which the lower ends of the tubes communicate, and into which the unevaporated liquid from the same flows, and a pump or equivalent means for returning liquid from the well P into the interior surfaces of the tubes, substantially as specified.

7. In an evaporating apparatus, the combination of the heating-chamber E, battery of tubes $b$, dome D, communicating with the tubes $b$ at their upper extremities, means for maintaining a more or less perfect vacuum in the dome D, means for distributing a liquid over the interior surfaces of the tubes, and well P, for receiving the liquid that may flow from the lower ends of the tubes $b$, substantially as specified.

8. The combination, in an evaporating apparatus, of the chamber E, dome D, well P, tubes $b$, extending through chamber E, and communicating above with the dome D and below with the well P, means for delivering a liquid upon the interior surfaces of each tube near the top, and suitable vacuum apparatus communicating with the dome D and with the well P, and adapted to maintain a partial vacuum in both, substantially as specified.

9. The combination, in an evaporating apparatus, of the heating-chamber E, chamber G, dome D, well P, tubes $b$, extending through the heating-chamber, and communicating above and below, respectively, with the dome D and well P, suitable channels leading from the chamber G into the interior of each tube, and means for introducing the liquid to be evaporated into the chamber G, substantially as specified.

10. The combination, in an evaporating apparatus, of the chamber E, dome D, chamber G, well P, tubes $b$, tubes $c$, extending from dome D into the upper ends of tubes $b$, and channels in walls of tubes c, between G and the interiors of tubes b, substantially as specified.

11. In an evaporating apparatus constructed substantially as described, the combination, with the chamber G and well P, of a pump, M, or other suitable means for returning liquid from the well P into the chamber G, substantially as described.

12. In an evaporating apparatus, the combination of the heating-chamber E, dome D, well P, tubes b, extending through the heating-chamber, and communicating above and below, respectively, with the dome D and well P, and means for delivering the liquid to be evaporated onto the interior surfaces of the tubes, substantially as specified.

13. In an evaporating apparatus, the combination of the heating-chamber E, dome D, well P, tubes b in the heating-chamber, and communicating above and below, respectively, with the dome D and well P, and a pump with proper connection, or other suitable means for delivering liquid from the well P upon the interior surfaces of the tubes, substantially as specified.

S. MORRIS LILLIE.

Witnesses:
PAUL E. SEEBER,
JACOB C. MUENCH.